UNITED STATES PATENT OFFICE.

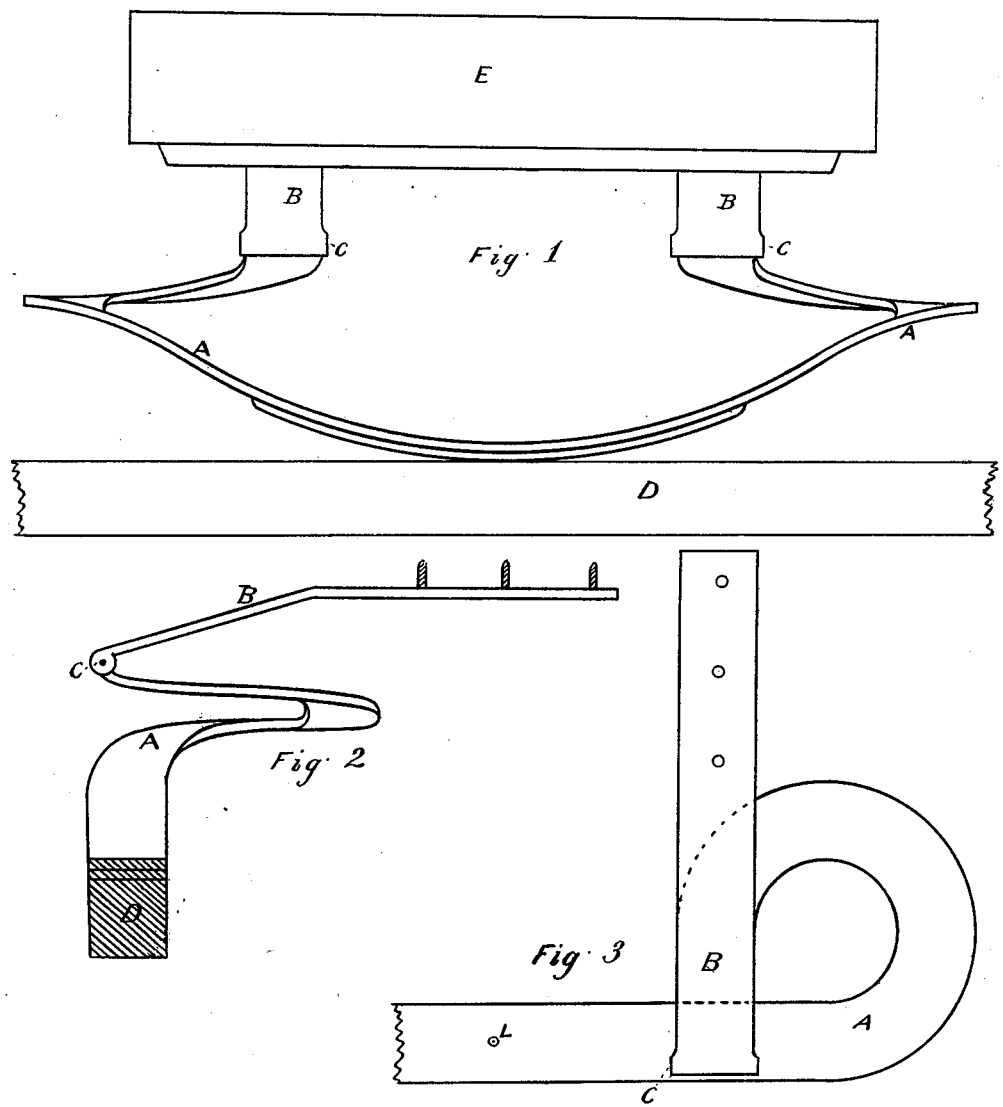

CYRUS N. SCHOFIELD, OF OSHKOSH, WISCONSIN.

IMPROVEMENT IN VEHICLE-SPRINGS.

Specification forming part of Letters Patent No. 200,877, dated March 5, 1878; application filed August 27, 1877.

*To all whom it may concern:*

Be it known that I, CYRUS N. SCHOFIELD, of the city of Oshkosh, in the county of Winnebago and State of Wisconsin, have invented certain Improvements in Wagon-Springs, of which the following is a specification:

The nature of my invention relates to the use of a spiral spring at each end of the semi-elliptic spring in common use, either with or without a jointed stay-arm attached to the wagon box or body. The stay-arm may be elastic or not, as desired. The spirals are simply prolongations of the semi-elliptic, and the whole spring, from end to end of the spirals, is in one leaf.

The object is to secure a pliable spring affording the greatest amount of elasticity in the combination of the semi-ellipse and spiral with the least intricacy of construction.

In the drawings, Figure 1 is a front elevation. Fig. 2 is a side elevation. Fig. 3 is a plan.

A is the spring, attached to the axle D in the usual manner. The spirals may be longer or shorter than shown, or may begin at or near the center of the spring at L.

B is the stay-arm, to which the box E may be attached. It is connected with the end of the spirals by a joint, C.

Having thus described my invention, what I claim as new, and desire to secure by Letters Patent, is—

1. The combined semi-elliptic and double spiral spring A, constructed substantially as shown and described, for the purpose specified.

2. The spring A, in combination with the jointed stay-arm B, substantially as shown and described, for the purpose specified.

CYRUS N. SCHOFIELD.

Witnesses:
C. PALMER,
ROBERT McCURDY.